UNITED STATES PATENT OFFICE 2,623,808

DENTAL IMPRESSION COMPOSITIONS

Herbert G. Meyer, Los Angeles, Calif., assignor to Surgident, Ltd., East Los Angeles, Calif., a corporation of California No Drawing. Application June 2, 1951, Serial No. 229,650

8 Claims. (Cl. 18—47)

This invention pertains to dental impression materials and is particularly directed to a composition employing an irreversible colloid, said composition being preferably manufactured, shipped and stored in a finely divided, virtually dry condition, the composition being capable of being converted into a gelatinous, creamy, smooth suspension or paste at normal atmospheric temperatures and then setting into a resilient, tough, stiff gel or mass capable of being used as a mold for the casting of replicas of the subject whose impression had been taken. Compositions of this sort are used for taking impressions for inlays, fixed bridge abutments and other partial and full denture construction.

Alginates and water soluble gums or hydrophilic colloids are generally derived from kelp (see United States Patents 2,036,934 and 2,128,551) and are available on the market in the form of sodium and potassium alginates. Alginates have been used instead of agar-agar in the manufacture of impression compounds. Such compounds ordinarily include some inert filler or distender such as calcium carbonate, gypsum, magnesium carbonate, diatomaceous silica, fibrous material, etc. Heretofore it has been deemed necessary to employ silico fluorides to cause the gel to set with sufficient strength, rigidity and ability to reproduce undercuts. Various other materials, including buffer salts, have been employed in such compositions and a great many materials such as soaps, synthetic resins, balata, latex, rubber-like materials, etc. have also been employed in an attempt to develop suitable physical properties in the gel.

Not only should the impression material have dimensional stability and the ability to accurately reproduce objects provided with undercut portions, but in addition the composition should be capable of producing castings having a smooth, hard surface. In dental work the impression is used as a mold in the making of gypsum and similar cement casts; various types of quick setting, fine grained, hard gypsum compositions are used. Many impression materials however include chemical components which deleteriously affect the character of the cast; in some instances the cast develops a powdery or pitted surface which is very unsatisfactory; in other instances the setting time of the stone is unfavorably influenced.

The present invention is directed to discoveries made in the preparation of impression materials employing alginates as the hydrophilic colloid and to the utilization of components in such compositions whereby optimum characteristics will be imparted to the impression material and to the casts made therein.

It is an object of the present invention therefore to disclose and provide ingredients, methods of compounding and proportions whereby improved dental impression materials are attained.

Another object of the invention is to disclose and provide dental impression materials which are stable, uniform in characteristics and insure the procurement of optimum casts.

These and other objects and advantages of the present invention will be more fully understood from the detailed description given hereinafter of certain exemplary compositions and the mechanism of their operation.

As previously indicated, two essential components of the composition are an alginate and a virtually inert filler or distender. Either sodium or potassium alginate may be used; the preferred filler for use in the instant composition is a finely divided calcined diatomaceous silica. Such diatomaceous silica may be obtained by calcining natural diatomaceous earth in the presence of a small quantity of an alkaline fluxing material; it is available commercially in various ranges of particle size, but the preferred material has an average particle size of between about six and ten microns.

The composition which insures the setting of the gel within a short period of time and at normal atmospheric temperatures comprises, in accordance with the teachings of this invention, a mixture of lead thiosulfate, basic aluminum acetate and an alkali metal salt of pyrophosphoric acid. It is to be remembered that the impression materials are preferably supplied to the dentist in powdered, substantially dry form; the dentist adds a predetermined quantity of water thereto and spatulates the material thoroughly to produce a smooth, creamy consistency. The mixing time should not be overly long and the desired consistency rapidly developed. The material should be capable of setting within a period of about six minutes from the time of start of mixing so as to permit the dentist to take his impression without delay and to remove it from the mouth within four minutes of the time that the impression tray has been placed in the mouth.

The formation of the gel involves the precipitation of the water-soluble alginate in the form of a metal alginate. Such precipitation or gel formation must be controlled and cannot be premature. In accordance with the present invention, it is believed that aluminum and lead alginates are formed. The lead thiosulfate employed is very sparingly soluble in water, but is soluble in sodium thiosulfate solutions and in acid solutions. In the preferred composition to which this invention is directed the alkali metal salt of pyrophosphoric acid delays the action of the lead thiosulfate by first forming lead phosphates which are insoluble. The basic aluminum acetate is slightly soluble in water and facilitates the solution of the lead thiosulfate; it also appears to suitably increase the viscosity and the development of desired physical characteristics in the final gel. These three ingredients; namely, the lead thiosulfate, basic aluminum acetate, and phosphoric acid salt must be carefully balanced and it may be stated as a general rule that the amount of lead thiosulfate should be equal to or exceed in amount the combined amount of the aluminum acetate and the alkali metal salt of pyrophosphoric acid used.

Furthermore, although the amount of lead thiosulfate may be varied with respect to the amount of sodium or potassium alginate employed, it may be stated that in general practice, and particularly when dental impression materials are being compounded, the amount of lead thiosulfate is on the order of the amount of alginate employed. If, for example, 20% of alginate is used in the composition, the amount of lead thiosulfate may vary from about 17% to 23%, much stiffer gels being attained when the larger amount of lead thiosulfate is used.

It has also been found that substantially any dental impression material is improved by the addition thereto of a fluoride such as zinc fluoride, chromium fluoride, copper fluoride, or barium fluoride. These fluorides, of which zinc fluoride is preferred, insure the production of casts which are provided with smooth, hard, unpitted surfaces. Zinc fluoride may be used for this purpose, either in agar compositions or in alginate compositions.

The following table illustrates exemplary compositions embodying the present invention:

|  | By Weight | | |
| --- | --- | --- | --- |
|  | Percent | Percent | Percent |
| Potassium Alginate | 28 | 20.2 | 15 |
| Inert Filler | 30 | 40 | 50 |
| Lead Thiosulfate | 26 | 20 | 17.2 |
| Basic Aluminum Acetate | 12 | 9.5 | 8.1 |
| Tetra Sodium Pyrophosphate | 12.8 | 9.5 | 9.1 |
| Zinc Fluoride | 1.2 | 0.8 | 0.6 |

In the above table the inert filler employed was calcined diatomaceous silica (previously referred to) and the centrally disposed composition containing 40% of such filler has been found to be eminently suited for use in taking dental impressions. This particular composition may be made by mixing twelve grams of the virtually dry mixture with 25 cc.'s of water at normal atmospheric temperatures of say 70° F.; mixing and spatulation are performed easily and a smooth, creamy, homogeneous mass is readily obtained. This plastic, creamy mass starts to gel in about two and one-half minutes and becomes water-insoluble in five minutes from the time mixing was initiated. The material has excellent dimensional stability and passes all practical tests and requirements for impression material adapted for use by the dental profession.

The other two compositions referred to in the above table illustrates variations which have utility for various purposes and illustrate that the filler may vary from 30% to 50% by weight. The potassium alginates may vary from about 15% to about 30%. It will be noted that in each instance the lead thiosulfate is either equal to or is slightly in excess of the combined amount of the aluminum acetate and tetra sodium pyrophosphate. As previously stated, the zinc fluoride could be left out but because of its highly desirable effect upon the character of the stone cast in the impression, it is deemed desirable to employ a small quantity thereof.

It may be noted that zinc fluoride may be readily prepared by reaction between a solution of zinc nitrate or zinc sulfate and sodium fluoride, the precipitate being digested, filtered, washed, dried and powdered for use in the composition. Normally one hundred and fifty parts of zinc nitrate have been reacted in this manner with about forty-two parts of sodium fluoride.

All changes and modifications coming within the scope of the appended claims are embraced thereby.

I claim:

1. A finely divided, virtually dry composition for use in making dental impression material by the addition of water thereto, comprising, in combination with alginate and inert filler in quantities sufficient to produce a resilient gel: lead thiosulfate, basic aluminum acetate and an alkali metal salt of pyrophosphoric acid, the amount of lead thiosulfate by weight being greater than the aggregate weight of the aluminum acetate and alkali metal salt.

2. A finely divided, virtually dry composition for use in making dental impression material by the addition of water thereto, comprising: between about 30% and 50% by weight of an inert silicious filler; between about 15% and 30% by weight of an alkali metal alginate; between about 17% and 26% by weight of lead thiosulfate and the balance consisting essentially of basic aluminum acetate and tetrasodium pyrophosphate, the aggregate quantity of said acetate and pyrophosphate not exceeding the amount of lead thiosulfate.

3. A finely divided, virtually dry composition for use in making dental impression material by the addition of water thereto, comprising: between about 30% and 50% by weight of an inert silicious filler; between about 15% and 30% by weight of an alkali metal alginate, between about 0.5% and 1.2% of zinc fluoride, between about 17% and 26% by weight of lead thiosulfate and the balance consisting essentially of basic aluminum acetate and tetrasodium pyrophosphate, the aggregate quantity of said acetate and pyrophosphate not exceeding the amount of lead thiosulfate.

4. A gel-setting composition for use with alkali metal alginate, comprising: lead thiosulfate, basic aluminum acetate and an alkali metal salt of pyrophosphoric acid, the lead thiosulfate exceeding in amount the combined amount of the aluminum acetate and the alkali metal salt.

5. A finely divided, virtually dry composition for use in making dental impression material by the addition of water thereto, comprising, in combination with alginate and inert filler in quantities sufficient to produce a resilient gel: lead thiosulfate, basic aluminum acetate and an alkali metal salt of pyrophosphoric acid, the amount of lead thiosulfate by weight being greater than the aggregate weight of the aluminum acetate and alkali metal salt, and not over about 1.5% of a fluoride of a metal from the group consisting of zinc, barium, chromium and copper.

6. A finely divided, virtually dry composition for use in making dental impression material by the addition of water thereto, comprising, in combination with alginate and inert filler in quantities sufficient to produce a resilient gel: lead thiosulfate, basic aluminum acetate and an alkali metal salt of pyrophosphoric acid, the amount of lead thiosulfate by weight being greater than the aggregate weight of the aluminum acetate and alkali metal salt, and between about 0.6% and 1.2% by weight, of zinc fluoride.

7. A finely divided, virtually dry composition for use in making dental impression material by the addition of water thereto, comprising: an irreversible hydrocolloid, an inert filler, a gel-setting reagent and from about 0.6% to about 1.2% by weight of zinc fluoride, said hydrocolloid and filler being present in quantity to form a gel of desired resiliency when said composition is mixed with water and allowed to set.

8. A finely divided, virtually dry composition for use in making dental impression material by the addition of water thereto, comprising: between about 30% and 50% by weight of an inert filler; between about 15% and 30% by weight of an alkali metal alginate; between about 17% and 20% by weight of lead thiosulfate, and the balance consisting essentially of basic aluminum acetate and an alkali metal salt of pyrophosphoric acid, the aggregate quantity of said acetate and alkali metal salt not exceeding the amount of lead thiosulfate.

HERBERT G. MEYER.

REFERENCES CITED

The following references are of record in the file of this patent:

UNITED STATES PATENTS

| Number | Name | Date |
| --- | --- | --- |
| 2,165,680 | Stangenberg et al. | July 11, 1939 |